US007684920B2

(12) United States Patent
Feder et al.

(10) Patent No.: US 7,684,920 B2
(45) Date of Patent: Mar. 23, 2010

(54) METHOD FOR DRIVER INPUT GAUGING

(75) Inventors: Johannes Feder, Neutraubling (DE); Fernando Guillen Castillo, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 226 days.

(21) Appl. No.: 11/463,772

(22) Filed: Aug. 10, 2006

(65) Prior Publication Data

US 2007/0250238 A1 Oct. 25, 2007

(30) Foreign Application Priority Data

Aug. 12, 2005 (DE) ...................... 10 2005 038 290

(51) Int. Cl.
*G06F 17/10* (2006.01)

(52) U.S. Cl. .......................... 701/54; 123/376; 477/83; 73/866.1

(58) Field of Classification Search .................. 701/51, 701/57, 70, 54; 477/107, 83; 123/320, 370, 123/376, 406.25, 406.36, 406.46, 406.5; 340/441; 73/866.1; *G06F 17/10*
See application file for complete search history.

(56) References Cited

U.S. PATENT DOCUMENTS 3,724,618 A * 4/1973 Pruvot et al. .................. 477/52
4,875,041 A * 10/1989 Dannenberg ........... 340/870.13
5,631,430 A * 5/1997 King et al. ................. 73/866.1
6,128,547 A * 10/2000 Tomoeda et al. ............ 700/170
6,465,977 B1 * 10/2002 Farkas et al. ................ 318/432
6,519,999 B2 * 2/2003 Komura et al. ............... 73/1.88
6,546,329 B2 * 4/2003 Bellinger .................... 701/115
6,584,392 B1 * 6/2003 Jankovic et al. ............... 701/54
6,763,295 B2 * 7/2004 Katakura et al. .............. 701/70
6,814,688 B2 11/2004 Foelsche et al. ............. 477/120
6,847,877 B2 1/2005 Homeyer ..................... 701/51
6,991,584 B2 * 1/2006 Cowan ....................... 477/110
7,072,754 B1 * 7/2006 Sherrod ....................... 701/54
7,135,981 B1 * 11/2006 Lafontaine ................. 340/618
7,263,419 B2 * 8/2007 Wheals et al. ................ 701/36
7,270,622 B2 * 9/2007 Sporl et al. .................. 477/42
7,305,289 B2 * 12/2007 Gessner et al. ................ 701/33
2001/0020207 A1 * 9/2001 Lohrenz ...................... 701/57

(Continued)

FOREIGN PATENT DOCUMENTS

DE 19619324 A1 4/1997

(Continued)

*Primary Examiner*—Tuan C To
(74) *Attorney, Agent, or Firm*—King & Spalding L.L.P.

(57) ABSTRACT

In a method for parameter-related driver input gauging in motor vehicles, with the position of a moveable control element being determined, a theoretical maximum value of at least a parameter relevant for the drive system is defined and an actually recallable value of this parameter is determined. A change from a static to a dynamic driver input gauging is carried out below the actually recallable value of the parameter relevant for the drive system. A static gauging is carried out in a lower value range of this parameter such that the maximum displacement of the movable control element is assigned to the theoretical maximum value of the parameter, and if a threshold of the driver input is exceeded in an upper value range, a dynamic gauging is carried out such that the maximum displacement of the moveable control element is assigned to an actually recallable value of the parameter.

20 Claims, 2 Drawing Sheets

U.S. PATENT DOCUMENTS

| | | | | |
|---|---|---|---|---|
| 2002/0049525 | A1* | 4/2002 | Speicher et al. | 701/51 |
| 2002/0062814 | A1* | 5/2002 | Weiss | 123/320 |
| 2005/0101435 | A1* | 5/2005 | Cowan | 477/83 |
| 2005/0154504 | A1* | 7/2005 | Fenelli | 701/1 |

FOREIGN PATENT DOCUMENTS

| | | | | |
|---|---|---|---|---|
| DE | 19754286 | A1 | | 6/1999 |
| JP | 07076267 | A | * | 3/1995 |
| JP | 10202513 | A | * | 8/1998 |

* cited by examiner

METHOD FOR DRIVER INPUT GAUGING

PRIORITY

This application claims priority from German Patent Application No. de 10 2005 038 290.8, which was filed on Aug. 12, 2005, and is incorporated herein by reference in its entirety.

TECHNICAL FIELD

The invention relates to a method for driver input gauging in motor vehicles.

BACKGROUND

A driver input gauging is required in order to combine the gradually staggered activation of control elements by the driver with a targeted effect in the clearest possible manner.

An effective metering ability is particularly needed during braking and acceleration, said metering ability resulting in a predictable acceleration and/or deceleration of the motor vehicle. Only this ability to predict the reaction of the motor vehicle makes it possible, using familiarization and learning effects, to create a driving sensation tailored to the respective motor vehicle, said driving sensation giving the driver in question an ability to react which itself enables suitable responses in critical driving situations.

A corresponding gauging was originally effected in that the control elements, in the form of pedals for instance, were directly connected to displaceable function parts by means of mechanical connecting elements. An activation of the control elements thus automatically results in a metered displacement of the associated function part, for instance a flap of a carburetor restricting the air flow. A suitable adjustment ensures that the complete available pedal stroke is available for a precisely metered activation of the control element.

Modern systems for engine timing generally operate without a direct mechanical connection of a control element to a corresponding displaceable function part. The control elements to be activated by the driver should however correspond to conventional systems with regard to their functionality, so that extensive refamiliarization is not required if the type of motor vehicle is changed.

In the case of the accelerator, the position of the pedal is detected by corresponding sensors for this purpose and is translated into a position signal distinctly describing the position of the pedal. At the same time, the value of a parameter of the driver which is relevant for the drive system of the motor vehicle can be derived from the position of the accelerator. A corresponding gauging of this driver input allows a signal derived from the position signal of the accelerator to be achieved, said signal being routed to the motor timing, and resulting in an adjustment of this parameter corresponding to the driver input, provided the required value can be made available.

In particular, with torque-related interpretations of the driver input, two methods have hitherto been established for gauging the torque required by the driver.

The use of a permanently predetermined maximum value of the torque and the compensation of the maximum torque required is known. This maximum requirement exists for instance when the accelerator, as a position-relevant control element, is completely depressed. The respective current value of the torque required by the driver is determined according to this method, in which the fraction of the maximum value of the torque actually required by the driver is derived from the position of the pedal in relation to the full throttle position.

Aside from the respective current driver input, numerous further measurement variables are incorporated into modern motor vehicles in the timing of the torque to be released, which can partially result in a significant reduction in the maximum torque released. A restriction of the torque of this type partially has a higher priority compared with the driver input. When the torque desired by the driver is greater than the maximum possible torque, dead travel or play develops at the accelerator with a gauging with a constant maximum value. Said dead travel or play at least temporarily restricts the possibilities of the driver of exerting an influence on the driving behavior of the driven motor vehicle. This is a significant disadvantage of the method, particularly because some measurement variables, which predominantly result in a reduction in the maximum torque available, are not consciously recognized or not recognized at all by the driver.

Methods of a dynamic gauging of the driver input are thus known. In this way, by considering all measurement variables which could contribute to a restriction in the maximum torque, the respective current maximum recallable torque is determined. This maximum recallable torque is assigned to the maximum requirement by means of the driver. The respective current value of the torque actually required by the driver is likewise determined according to this method, in which the fraction of the maximum value of the torque required by the driver, which is in this case current and dependent on different influential parameters, is derived from the position of the pedal in relation to the full throttle position. A dead travel at the accelerator is prevented in this way. The disadvantage of this method is thus that an absolute calibration of the driver input is no longer possible. The driver input can be distorted by the engine dynamics, which is influenced by the most diverse boundary conditions such as for instance a smoke intensity restriction function. Numerous influential parameters partially change the gauging in short time segments, whereby the pick-up behavior of the engine changes constantly in terms of the driver's perception. As these changes can only be predicted in part, they have a negative effect, under some circumstances, on the development of the already claimed driving sensation, which can impair the safety in critical driving situations. This disadvantage can only be incompletely compensated by means of automatic control and safety systems.

The described problems can basically also be attributed to gauging systems, which are not based on or not only based on a torque-related interpretation of the driver input.

SUMMARY

The object of the invention is thus to specify a possibility of carrying out a gauging of a driver input by largely avoiding dead travel at the accelerator, said gauging resulting in a pick-up behavior of the engine which can be predicted by the driver when a specific value of a technical parameter relevant for the drive system of a motor vehicle is required.

This object can be achieved by a method for parameter-related driver input gauging in motor vehicles, in which in order to determine the driver input, the position of a moveable control element is determined, which can be moved from a rest position into a maximum displacement, with a theoretical maximum value of at least one parameter relevant for the drive system of the motor vehicle being determined and an actually recallable value of this parameter being determined, wherein a change from a static into a dynamic driver input gauging is carried out below the actually recallable value of the parameter relevant for the drive system of the motor vehicle, with a static gauging being carried out in a lower value range of this parameter in such a way that the maximum displacement of the moveable control element is assigned to the theoretical maximum value of the parameter relevant for the drive system of the motor vehicle and when a threshold in an upper value range is exceeded, a dynamic gauging is carried out such that the maximum displacement of the moveable control element is assigned to an actually recallable value of the parameter relevant for the drive system of the motor vehicle.

The position of an accelerator can be determined as a position of the moveable control element. During the dynamic gauging, the maximum displacement of the moveable control element can be assigned to the respective maximum actually recallable value of the parameter relevant for the drive system of the vehicle. The threshold, with which the change from static to dynamic driver input gauging is carried out, can be derived from the maximum actually recallable value of the parameter relevant for the drive system of the motor vehicle. The maximum actually recallable value of the parameter relevant for the drive system of the motor vehicle can be cyclically updated. The threshold, with which the change from static to dynamic gauging is carried out, can be smaller by a fixed factor than the respective maximum actually recallable value of the parameter relevant for the drive system of the motor vehicle. The threshold, with which the change from static to dynamic gauging is carried out, can be smaller by a factor than the respective maximum actually recallable value of the parameter relevant for the drive system of the motor vehicle, with measurement variables being included in the determination of the factor, the measurement variables depending on the engine speed, and/or the selected gear and/or the drive status and/or active dry running and/or the motor vehicle speed and/or the engine temperature and/or the accelerator position and/or different restrictions on the output, the engine speed, the fuel consumption and/or the torque and/or the total weight of the motor vehicle and/or the road surface incline and/or the wind speed. The gauging can be carried out in a linear fashion at least in the range of the static gauging. The gauging can be carried out in a linear fashion at least in the range of the dynamic gauging. In the range of the dynamic gauging, the gauging can be carried out according to a function stored as a data set or a stored curve family. The gauging can be carried out via a stored curve family, with measurement variables being included in the selection of the respective curve family, the measurement variables depending on the engine speed and/or the selected gear and/or the drive status and/or active dry running operation and/or the motor vehicle speed and/or the engine temperature and/or the accelerator position and/or different restrictions on the output, the engine speed, the fuel consumption and/or the torque and/or the total weight of the motor vehicle and/or the road surface incline and/or the wind speed. The transition from the static gauging on a theoretical fixed value of the parameter relevant for the drive system of the motor vehicle to the dynamic gauging on a current recallable value of the parameter relevant for the drive system of the motor vehicle can be carried out such that the required value of the parameter relevant for the drive system of the motor vehicle in the form of a constant function depends on the respective driver input. A torque, an engine speed, an acceleration, a force and/or an output can be included in the gauging for the parameter relevant for the drive system of the motor vehicle. The position of a moveable control element can be determined in order to determine the driver input, the control element being moveable from a rest position into a maximum displacement, with a theoretical maximum value of the torque being determined and the value of an actually recallable torque being determined, with a change from a static to a dynamic driver input gauging being carried out below the actual recallable torque, with a static gauging being carried out in a lower torque range such that the maximum displacement of the moveable control element is assigned to the theoretical maximum value of the torque and if a threshold of the required torque is exceeded in an upper torque range, a dynamic gauging is carried out such that the maximum displacement of the movable control element is assigned to an actually recallable torque.

The invention assumes that a value of a parameter relevant for the drive system of a motor vehicle is required by a driver in numerous driver situations, said parameter clearly lying below the maximum value of this parameter, which can be made available on the engine side. In addition, the required value frequently lies below the maximum value of the parameter relevant for the drive system of the motor vehicle released by the engine timing taking account of all influential factors, since an experienced driver attempts to avoid boundary situations, which would result in a collision of the driver input with the boundary values determined in a timing-specific manner.

The invention further assumes that it is irrelevant, in all cases in which the value of a parameter relevant for the drive system of the motor vehicle and desired by the driver input lies below the maximum admissible value, whether the maximum admissible value of this parameter is considered during the gauging of the driver input. In accordance with the invention, a gauging is carried out by means of a permanently predetermined maximum value when a value of a parameter relevant for the drive system of a motor vehicle is required, said parameter lying below the maximum admissible value, irrespective of whether this permanently predetermined maximum value could actually also be recalled. In this way, a pick-up behavior of the engine is produced in this value range, which is characterized by a high reproducibility, irrespective of momentary restrictions of the parameter relevant for the drive system of the motor vehicle.

If a higher value of the parameter relevant for the drive system of the motor vehicle is required by the driver, a change is carried out to a dynamic gauging of the driver input, so as to avoid disadvantageous effects of dead travel at the accelerator. With this dynamic gauging, account is taken in accordance with the invention into the maximal admissible value, in the respective situation, of the parameter relevant for the drive system of the motor vehicle.

The invention relates to a method for parameter-related driver input gauging in motor vehicles, in which the position of a movable control element is determined in order to determine the driver input, said control element being moveable from a rest position into a maximum displacement, with a theoretical maximum value of at least one parameter relevant for the drive system of the motor vehicle, in particular of the torque, being determined and an actual recallable value of this parameter being established, with a change from a static to a dynamic driver input gauging being carried out below the actual recallable value of the parameter relevant for the drive system of the motor vehicle, with a static gauging being carried out in a lower value range of the parameter such that the maximum displacement of the moveable control element is assigned to the theoretical maximum value of the parameter relevant for the drive system of the motor vehicle and with a dynamic gauging being carried out if a threshold of the driver input exceeds an upper value range such that the maximum displacement of the moveable control element is assigned to an actual recallable value of the parameter relevant for the drive system of the motor vehicle. Here the moveable control element is in many cases an accelerator, the position of which is monitored with the aid of conventional sensors.

In accordance with the invention, a torque, an engine speed, an acceleration, a force and/or an output can be included in the gauging as parameters relevant for the drive system of the motor vehicle. In this way it is just as possible for the realisation of the gauging to obtain the respective parameters in an engine or drive-related manner. The example of the torque means that either the torque (TQI—indicated torque) generated by the combustion process, the coupling moment (TQ-TQI minus engine-internal loss and if necessary losses by means of auxiliary devices such as for instance climate control systems) or a torque present in the drive system or the drive train can be used.

The engine-side resource can be optimally utilized if the maximum displacement of the moveable control element is assigned to the respective maximum actual recallable value of the parameter relevant for the drive system of the motor vehicle during the dynamic gauging. It is also advantageous if the threshold, with which the change from static to dynamic driver input gauging is carried out, is derived from the maximum actual recallable value of the parameter relevant for the drive system of the motor vehicle.

For this purpose, it is advantageous if the maximum actual recallable value of the parameter relevant for the drive system of the motor vehicle is cyclically updated in order to allow a permanent availability and a more secure dynamic gauging. The intervals between the individual updatings should lie at least clearly below the response times of the driver.

A particularly simple realization of the method according to the invention results if the threshold, with which the change from static to dynamic gauging is carried out, is smaller by a fixed factor than the respective maximum actual recallable value of the parameter relevant for the drive system of the motor vehicle.

Alternatively, a particularly user-friendly realization of the method according to the invention results for this purpose if a direct reaction can be made by choosing the corresponding threshold on different boundary conditions influencing the engine management. In this case, it is advantageous if the threshold, in which the change from static to dynamic gauging is carried out, is likewise smaller by a factor than the respective maximum actual recallable value of the parameter relevant for the drive system of the motor vehicle, with measurement variables being included in the determination of the factor, said measurement variables depending on the engine-speed and/or the selected gear and/or the drive status and/or active dry running and/or the motor vehicle speed and/or the engine temperature and/or the accelerator position and/or different restrictions on the output, the speed, the fuel consumption and/or the torque and/or the total weight of the motor vehicle and/or the road surface incline and/or the wind speed.

The invention can be realized with a linear gauging both in the range of static and also dynamic gauging.

In a particularly effective variant, the gauging in the range of the dynamic gauging is carried out according to a function stored as a data set or according to a stored curve family, which allows the respective driver input to be assigned to the actual recalled values of the parameter relevant for the drive system of the motor vehicle (e.g. torque). In particular, the variant with a stored curve family enables the measurement variables to be included in the selection of the respective curve family, said measurement variables depending on the engine speed and/or the selected gear, and/or the drive status and/or active dry running and/or the motor vehicle speed and/or the engine temperature and/or the accelerator position and/or different restrictions on the output, the engine speed, the fuel consumption and/or of the torque and/or the total weight of the motor vehicle and/or the road surface incline and/or the wind speed.

To avoid an abrupt change in the pick-up behavior, it is advantageous if the transition from the static gauging on a theoretical value to a dynamic gauging on a current recallable value of the parameter (e.g. torque) relevant for the drive system of the motor vehicle is carried out such that the requested value of the parameter relevant for the drive system of the motor vehicle also depends on the respective driver input in the transition region in the form of a constant function. Jerky accelerations or decelerations of the motor vehicle can be avoided in this manner.

BRIEF DESCRIPTION OF THE DRAWINGS

The invention is described in more detail in the exemplary embodiment of a torque-related driver input gauging, in which.

DETAILED DESCRIPTION

The idea behind the invention is converted in the present exemplary embodiment into a method for torque-related driver input gauging.

Figure 1:
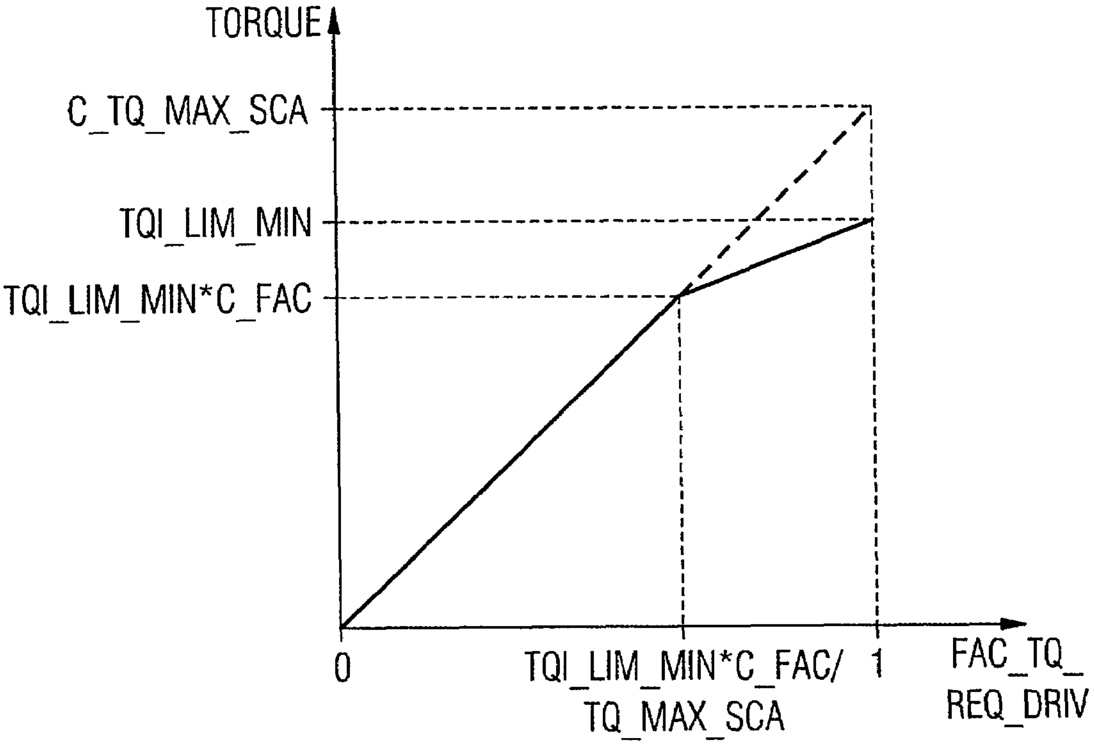
FIG. 1 shows the dependency of the actually recalled torque on the respective driver input with time-independent restriction of the torque.

FIG. 1 indicates in the form of a diagram the dependency of the actually recalled torque on the respective driver input with time-independent restriction of the torque over a complete gauging range. The torque (TORQUE) is plotted on the y-coordinates and the driver input (FAC_TQ_REQ_DRIV) on the x-coordinates. A driver input of 0 means that the accelerator is at rest, with a driver input of 1, the acceleration pedal is completely depressed.

Three input values are needed to implement the method according to the invention. First of all a theoretical value of the torque (C_TQ_MAX_SCA) is required, which should lie at least proximate to the theoretical maximum moment. The maximum torque can only be released subject to optimum conditions. Secondly, an actually recallable value of the torque is required, which advantageously describes the respective maximum actually recallable torque (TQI_LIM_MIN). In the present case, this value is constant, as can be effected for instance by an engine restriction with a restricted torque. A threshold forms the third input value, which, if exceeded, brings about a change in the gauging mode. This threshold is at present smaller than the value of the maximum actual recallable torque (TQI_LIM_MIN) by the constant factor C_FAC.

A gauging in the form of a linear dependency of the required torque on the respective driver input is carried out both below and also above the threshold (TQI_LIM_MIN*C_FAC). The gauging below the threshold (TQI_LIM_MIN*C_FAC) is carried out as if the torque of the theoretical value of the torque (C_TQ_MAX_SCA) would be recalled proximate to the theoretical maximum torque in the case of a maximum driver input. This ideal value is however only really available in exceptional cases. Abandoning the optimal engine speed already allows the driver to really use the absolute maximum of the torque. It is irrelevant whether, under the given conditions, the maximum torque of the engine can actually be recalled for the gauging in the lower torque range.

Another gauging is carried out in accordance with the invention, only when a torque is first requested by the driver input, said torque lying proximate to the maximum actual recallable torque (TQI_LIM_MIN), with the maximum driver input no longer corresponding to the maximum actual recallable torque (TQI_LIM_MIN). In the present case, the change is carried out abruptly when the threshold (TQI_LIM_MIN*C_FAC) is exceeded, however on the boundary condition such that the transition from the static gauging on a theoretical value of the torque (C_TQ_MAX_SCA) to gauging on the current maximum value of the recallable torque (TQI_LIM_MIN) is carried out such that the required torque in the form of a constant function depends on the respective driver input (FAC_TQ_REQ_DRIV).

Figure 2:
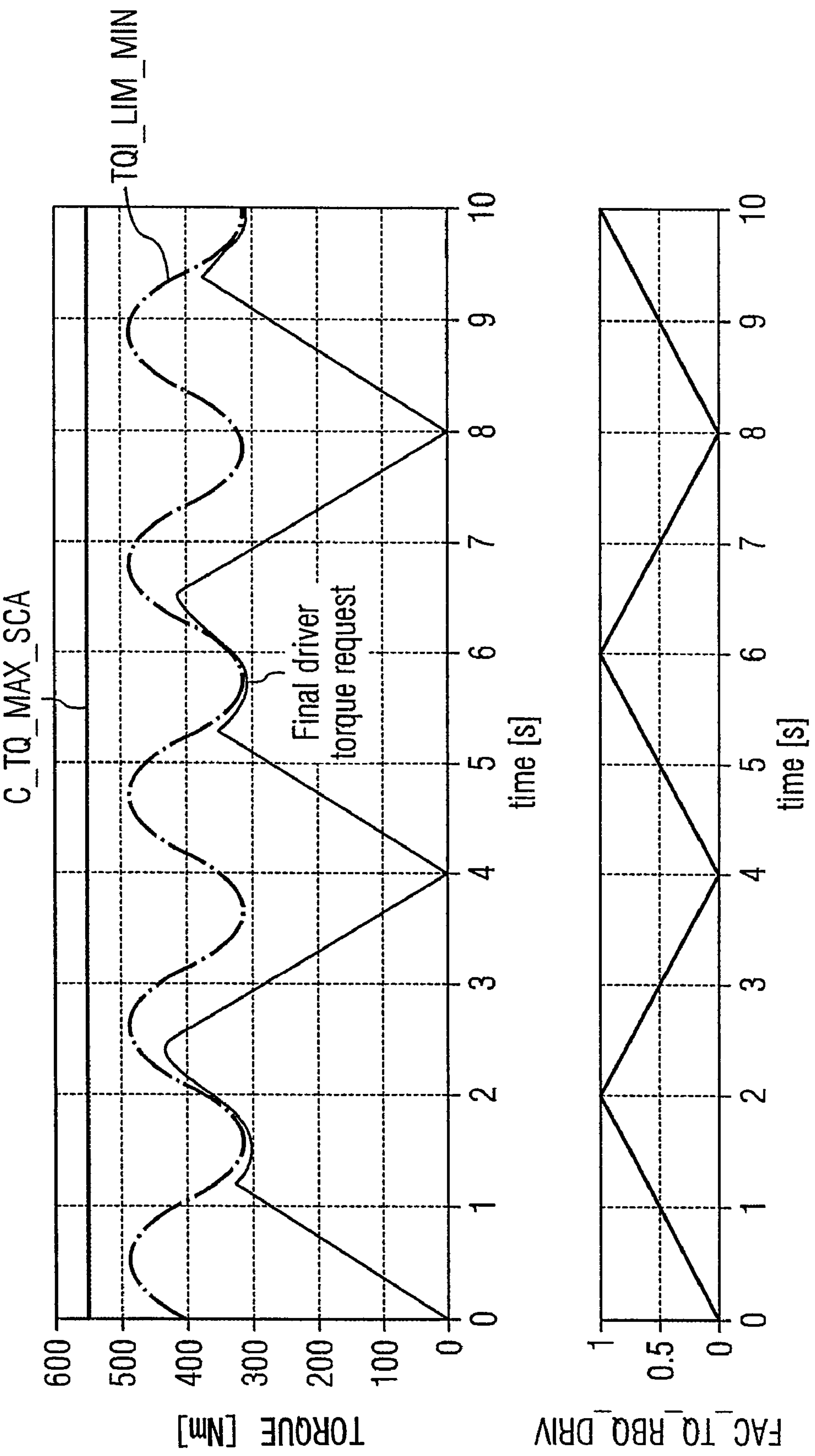
FIG. 2 shows the temporal course of the actually released torque with time-dependent restriction of the torque.

FIG. 2 shows the temporal course of the actually recalled torque during time-dependent restriction of the torque and inventive gauging as a result of a simulation. In this representation, the principle of the transition according to the invention from a static to a dynamic driver input gauging is particularly clear.

In the lower part, the temporal course of the driver input (FAC_TQ_REQ_DRIV) is displayed with a periodically activated accelerator. In this way the accelerator is completely depressed within two seconds and is subsequently transferred back again into the starting position within two seconds. This procedure is repeated several times.

In the upper part of the illustration, the temporal courses of a theoretical value of the torque (C_TQ_MAX_SCA), of the maximum actual recallable torque (TQI_LIM_MIN) and of the actually required torque (final driver torque request) required for the static gauging are displayed taking into account the inventive gauging of the driver input. Whilst the theoretical value remains constant, assumptions are made in the present simulation on an oscillating value of the maximum actually recallable torque (TQI_LIM_MIN).

When initially activating the accelerator, the driver input focuses on a torque, which clearly lies below the current value of the maximum actual recallable torque (TQI_LIM_MIN). In this range, a gauging on the theoretical value (C_TQ_MAX_SCA) is carried out independently of the actually recallable torque.

Driver input and an actually recallable torque increase in a linear fashion and in proportion with one another.

In a further course, a torque is requested per driver input, which lies proximate to the maximum actual recallable torque (TQI_LIM_MIN). The transition to a dynamic gauging is carried out in accordance with the invention, with the maximum driver input no longer corresponding to the maximum actual recallable torque (TQI_LIM_MIN), which is itself dependent on time. In the present case, the change is again carried out abruptly whilst exceeding the likewise time-dependent threshold (TQI_LIM_MIN*C_FAC), on the boundary condition such that the transition from the static gauging on a theoretical value of the torque (C_TQ_MAX_SCA) to the gauging on the current maximum value of the recallable torque (TQI_LIM_MIN) is carried out such that the required torque in the form of a constant function is dependent on the respective driver input (FAC_TQ_REQ_DRIV). The time of the change between the individual gauging types can be read off in each instance at the sharp bend-like course of the curve of the actually required torque.

When the driver input is increased further, during the phase of the dynamic gauging, the actually required torque approaches the respective current course of the maximum value of the recallable torque (TQI_LIM_MIN). In the case of a fully depressed accelerator, both values are identical. Conversely, a transition from the dynamic to the static gauging, which is indicated in the linear drop of the actually required torque, takes place when the driver input dies out.

What is claimed is:

1. A method for parameter-related driver input gauging in motor vehicles, comprising the steps of:

in order to determine the driver input, determining the position of a moveable control element, which can be moved from a rest position into a maximum displacement, determining a theoretical maximum value of at least one parameter relevant for the drive system of the motor vehicle is determined and an maximum actually recallable value of this parameter is determined, if the determined position is below a threshold, assigning said parameter according to a first function in which the maximum displacement corresponds to the theoretical maximum value, and if the determined position is greater or equal the threshold, assigning said parameter according to a second function in which the maximum displacement of the moveable control element corresponds to the maximum actually recallable value.

2. A method according to claim 1, wherein the position of an accelerator is determined as a position of the moveable control element.

3. A method according to claim 1, wherein in case of the maximum displacement of the moveable control element, the parameter is dynamically assigned to a variable maximum actually recallable value of the parameter relevant for the drive system of the vehicle.

4. A method according to claim 1, wherein the threshold is derived from the maximum actually recallable value of the parameter relevant for the drive system of the motor vehicle.

5. A method according to claim 1, wherein the maximum actually recallable value of the parameter relevant for the drive system of the motor vehicle is cyclically updated.

6. A method according to claim 4, wherein the threshold is smaller by a fixed factor than the respective maximum actually recallable value of the parameter relevant for the drive system of the motor vehicle.

7. A method according to claim 4, wherein the threshold is smaller by a factor than the respective maximum actually recallable value of the parameter relevant for the drive system of the motor vehicle, with measurement variables being included in the determination of the factor, said measurement variables depending on at least one of an engine speed, a selected gear, a drive status, an active dry running, a motor vehicle speed, an engine temperature, an accelerator position, a different restrictions on one of the output, the engine speed, a fuel consumption and a torque, a total weight of the motor vehicle, a road surface incline, and a wind speed.

8. A method according to claim 1, wherein the gauging is carried out in a linear fashion at least in a range below the threshold.

9. A method according to claim 1, wherein the gauging is carried out in a linear fashion at least in a range above the threshold.

10. A method according to claim 1, wherein in a range above the threshold, the gauging is carried out according to a function stored as a data set or a stored curve family.

11. A method according to claim 10, wherein the gauging is carried out via a stored curve family, with measurement variables being included in the selection of the respective curve family, said measurement variables depending on at least one of: the engine speed, the selected gear, the drive status, active dry running operation, the motor vehicle speed, the engine temperature, the accelerator position, different restrictions on one of the output, the engine speed, the fuel consumption and the torque, the total weight of the motor vehicle, the road surface incline, and the wind speed.

12. A method according to claim 1, wherein the transition from a static gauging on a theoretical fixed value of the parameter relevant for the drive system of the motor vehicle to a dynamic gauging on a current recallable value of the parameter relevant for the drive system of the motor vehicle is carried out such that the required value of the parameter relevant for the drive system of the motor vehicle in the form of a constant function depends on the respective driver input.

13. A method according to claim 1, wherein at least one of a torque, an engine speed, an acceleration, a force and an output is included in the gauging for the parameter relevant for the drive system of the motor vehicle.

14. A method according to claim 1, wherein a change from a static to a dynamic driver input gauging is carried out below the actual recallable torque, wherein a static gauging being carried out in a lower torque range such that the maximum displacement of the moveable control element is assigned to the theoretical maximum value of the torque and if a threshold of the required torque is exceeded in an upper torque range, a dynamic gauging is carried out such that the maximum displacement of the movable control element is assigned to an actually recallable torque.

15. A method for parameter-related driver input gauging in motor vehicles, comprising the steps of:

determining the position of a moveable control element, which can be moved from a rest position into a maximum displacement, wherein a theoretical maximum value of at least one parameter relevant for the drive system of the motor vehicle is determined and an actually recallable value of this parameter is determined, if the determined at least one parameter is below a threshold, operating the motor vehicle in a static gauging in such a way that the maximum displacement of the moveable control element is assigned to the theoretical maximum value of the parameter relevant for the drive system of the motor vehicle, and if the determined at least one parameter is greater or equal the threshold, operating the motor vehicle in a dynamic gauging such that the maximum displacement of the moveable control element is assigned to an actually recallable value of the parameter relevant for the drive system of the motor vehicle.

16. A method according to claim 15, wherein the position of an accelerator is determined as a position of the moveable control element.

17. A method according to claim 15, wherein in case of the maximum displacement of the moveable control element, the parameter is dynamically assigned to a variable maximum actually recallable value of the parameter relevant for the drive system of the vehicle.

18. A method according to claim 15, wherein the threshold is derived from the maximum actually recallable value of the parameter relevant for the drive system of the motor vehicle.

19. A method according to claim 15, wherein the maximum actually recallable value of the parameter relevant for the drive system of the motor vehicle is cyclically updated.

20. A method according to claim 19, wherein the threshold, with which the change from static to dynamic gauging is carried out, is smaller by a fixed factor than the respective maximum actually recallable value of the parameter relevant for the drive system of the motor vehicle.

* * * * *